July 2, 1935. V. G. APPLE 2,006,334
BRAKE MECHANISM
Filed Nov. 2, 1929 2 Sheets-Sheet 1

INVENTOR.
Vincent G. Apple
BY Burton & McConkey
ATTORNEYS

Patented July 2, 1935

2,006,334

UNITED STATES PATENT OFFICE 2,006,334

BRAKE MECHANISM

Vincent G. Apple, Dayton, Ohio, assignor to Bendix Brake Company, South Bend, Ind., a corporation of Illinois Application November 2, 1929, Serial No. 404,243

4 Claims. (Cl. 188—2)

My invention relates to improvements in brakes and has particular reference to those adapted for use on automotive vehicles.

An object is to adapt a completely enclosed dirt and waterproof brake assembly such as that disclosed in my copending application Serial No. 404,241, filed November 2, 1929 for use with a full floating axle.

Generally, the object of my invention is to so connect the electric motor power means with the retarding means that it will be unnecessary to maintain a flow of current through the motor in order to retain the brakes in their applied position and to provide such a connection between the motor and the retarding means that the reversal of the motor will function to permit the release of the brakes, and to adapt this entire construction to a full floating axle structure.

Figure 1:
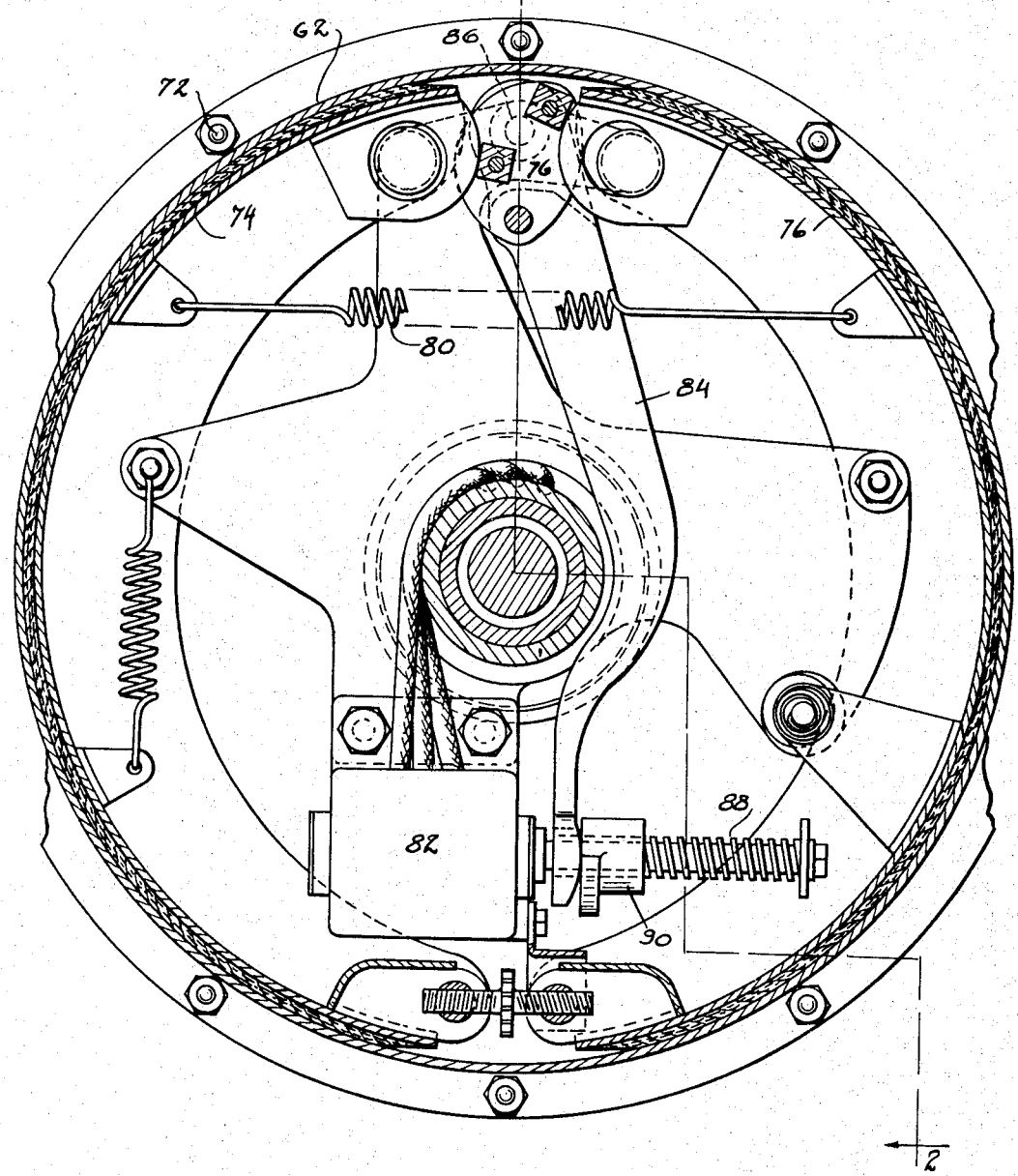
Fig. 1 is a transverse section taken on line 1—1 of Fig. 2.

The axle structure of the vehicle wheel includes the tubular spindle 1 swaged at 2 and having the re-inforcing member 3 riveted to it at 4. A sleeve or axle member 6 fits snugly over the spindle 1 and is held against rotation thereon by a series of external teeth 8 at the end of the sleeve which fit into the internal teeth 10 of member 3.

An anti-friction bearing 12 has an inner race 14 of a diameter to fit snugly over the spindle 1 and a nut 16 threaded at 18 onto the end of the spindle forces this inner race against the end of the sleeve 6, which in turn is forced against shoulder 20 of the re-inforcing member 3, whereby race 14 and sleeve 6 are secured against axial movement.

The outer race 22 of the bearing 12 supports the bearing housing 24, a nut 26 threaded into the housing 24 securing the housing against axial movement on the race 22. Packing ring 30 is secured to the housing 24 by the nut 34 and keeps the lubricant within the bearing housing and out of the compartment 36 which contains the friction members.

Another anti-friction bearing 38 of relatively large diameter for its capacity has its inner race 40 fitted snugly to the outside of the sleeve or axle member 6, but is not restricted in axial movement thereon. This allows the inner end of the drum to be free to accommodate itself to any expansion or contraction or other movement of the drum. The outer race 42 supports the bearing housing 44, the two members being secured against relative axial movement by the nut 46 threaded into the housing at 48. Washers 50 and 52 held between the nut 46 and the race 42 are arranged with space between them for the packing ring 56, which prevents escape of the lubricant within the housing 44 to the outside of the structure. Another packing ring 58, retained in the housing 44 by the nut 60, keeps the lubricant within the housing and out of the compartment 36 which contains the friction members.

The brake drum 62 is secured to a flange 64 extending outwardly from the housing 24 by means of the rivets 66, and the brake drum cover 68 is similarly secured to the flange 70 of housing 44. The drum cover is secured to the drum by means of the bolts 72, forming the watertight compartment 36 in which the friction members are located.

Figure 2:
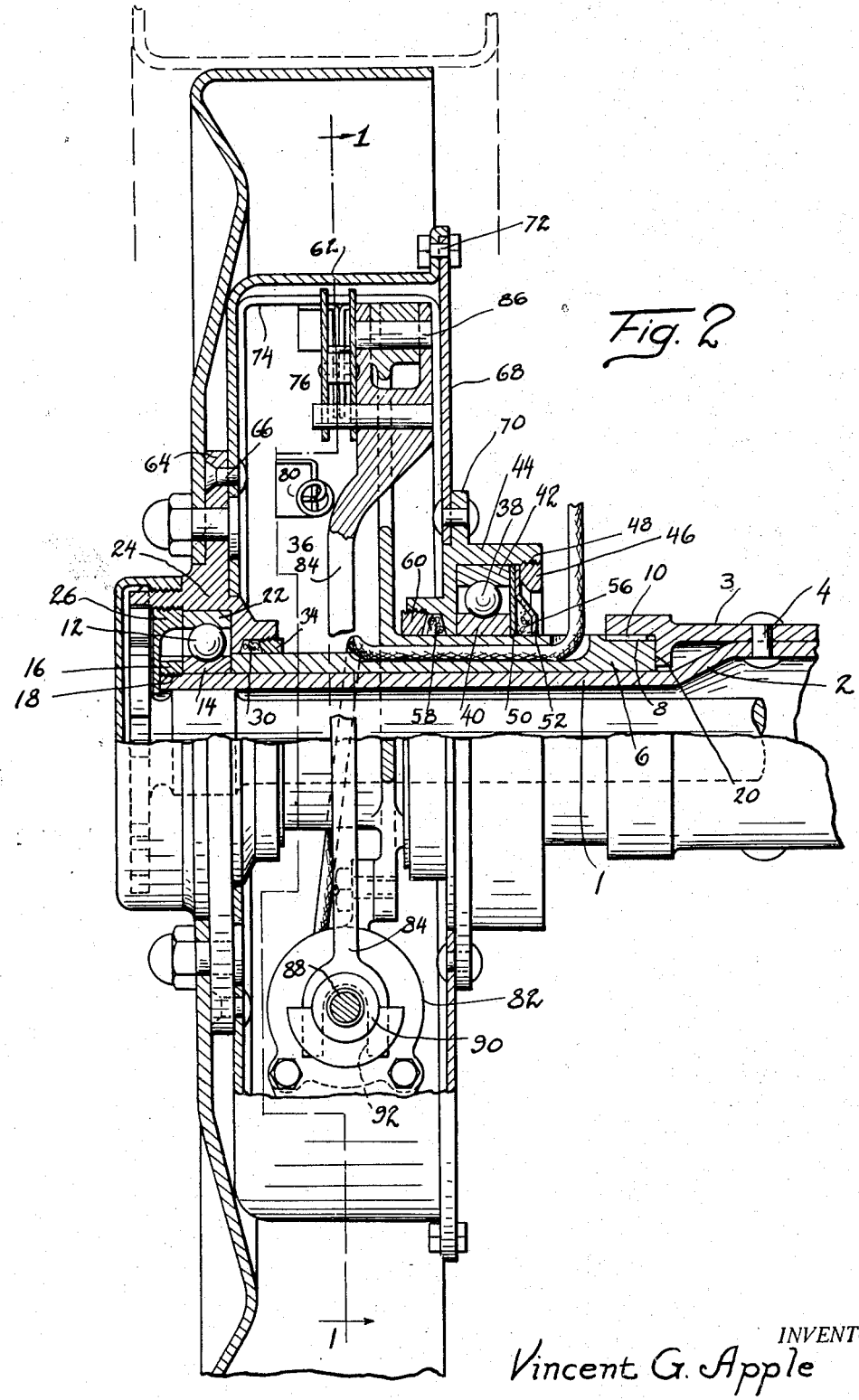
Fig. 2 is a vertical axial section taken on the line 2—2 of Fig. 1.

The non-rotatable friction means is composed of the customary brake shoes 74 and 76, which differ from the ordinary shoes, however, in that they are channel shaped in cross section, as clearly seen in Fig. 2 of the drawings. This is necessitated by the fact that both sides of the brake drum revolve in this assembly and for that reason the brake operating mechanism cannot be mounted, as is customary, on a backing plate. In lieu of the backing plate I have provided the axle member 6 with radially extending arms which carry the camming mechanism, broadly indicated at 76 in the drawings, for expanding the brake shoes against the tension of the spring 80, and the reversible electric motor 82 which operates the camming means through the brake arm 84, also secured to one of the aforesaid radially extending arms by the pivotal connection 86.

The armature shaft of this electric motor is provided with a threaded extension 88 on which there is a correspondingly threaded weighted runner 90. The fact that the runner is weighted normally prevents it from rotating when shaft 88 is rotated. The brake arm 84 is bifurcated at one extremity, as at 92, so that it straddles the extension of the armature shaft and its face adjacent the runner 90 is somewhat rounded to minimize the friction between the two as the axial movement of the runner swings the brake arm in an arc about its pivot 86 to operate the camming mechanism 76 and thus apply the brakes.

The brakes are shown in their "on" position, but when the motor is reversed the runner will slide axially to the right on the armature shaft extension and permit the release of the brakes by means of the customary springs, including 80, acting through the cam mechanism 76. It is obvious that the threaded connection between the armature shaft extension and the runner will retain the brake arm in whatever position it may be when the electric current is cut off and the shaft ceases to rotate. Thus the brakes will be retained in any intermediate position without the expenditure of any electrical energy.

While one illustrative embodiment of my invention has been described, it is not my intention to limit its scope to that particular embodiment, or otherwise than by the terms of the appended claims.

I claim:

1. Brake mechanism comprising, in combination, an axle structure, a hollow closed brake drum provided with a bearing housing at each end, a bearing within each housing, means cooperating with the bearing housing at one end of the drum positioning the drum upon the axle structure, said other bearing housing being free to shift axially with respect to the axle structure to accommodate for expansion or contraction of the drum.

2. Brake mechanism comprising, in combination, an axle structure, an integral brake drum closed at each end and journalled for rotation about said axle structure, means cooperating with one end of the drum positioning the same axially with respect to the axle structure, said other end of the drum being free to float axially with respect to the axle structure.

3. Brake mechanism comprising, in combination, an axle structure, an integral brake drum closed at each end and journalled about said axle structure, means cooperating with one end of the drum positioning the same axially with respect to the axle structure, said other end of the drum being free to float axially with respect to the axle structure, means sealing each end of the drum against entrance of foul material about the axle structure into the drum.

4. Brake mechanism comprising, in combination, an axle structure, an integral brake drum closed at each end and having each end journalled for rotation about said axle structure, means sealing each end of the drum about said axle structure, means positioning one end of the drum with respect to the axle structure, said other end being free to float with respect thereto.

VINCENT G. APPLE.